(12) United States Patent
Strothmann

(10) Patent No.: US 6,366,037 B1
(45) Date of Patent: Apr. 2, 2002

(54) SEPARATELY EXCITED ELECTRIC MACHINE

(76) Inventor: Rolf Strothmann, Saarbrücken, D-66123 Saarbrücken (DE)

( * ) Notice: Subject to any disclaimer, the term of this patent is extended or adjusted under 35 U.S.C. 154(b) by 0 days.

(21) Appl. No.: 09/486,033

(22) PCT Filed: Jul. 22, 1998

(86) PCT No.: PCT/EP98/04594

§ 371 Date: Feb. 17, 2000

§ 102(e) Date: Feb. 17, 2000

(87) PCT Pub. No.: WO99/09645

PCT Pub. Date: Feb. 25, 1999

(30) Foreign Application Priority Data

Aug. 18, 1997 (DE) ....................................... 297 14 604 U
Sep. 19, 1997 (DE) ....................................... 297 16 812 U

(51) Int. Cl.[7] ............................................. H02R 29/00
(52) U.S. Cl. ..................... 318/138; 318/254; 318/439
(58) Field of Search ................................ 318/254, 138, 318/439

(56) References Cited

U.S. PATENT DOCUMENTS

| 4,211,963 | A | * | 7/1980 | Muller ........................ 318/254 |
| 4,912,378 | A | * | 3/1990 | Vukosavic ................... 318/254 |
| 4,924,125 | A | * | 5/1990 | Clark ....................... 310/67 R |
| 5,159,246 | A | * | 10/1992 | Ueki ........................... 318/254 |
| 5,182,499 | A | * | 1/1993 | Inaji et al. ................... 318/254 |
| 5,254,914 | A |   | 10/1993 | Dunfield et al. ............. 318/254 |
| 5,256,923 | A |   | 10/1993 | Bartos et al. ............... 310/166 |
| 5,552,682 | A | * | 9/1996 | Ushikoshi .................... 318/254 |
| 5,777,416 | A | * | 7/1998 | Kolomeitsev ............... 310/168 |

FOREIGN PATENT DOCUMENTS

| DE | 2511567 | 9/1976 |
| EP | 0183277 | 6/1986 |
| EP | 0500295 | 8/1992 |

OTHER PUBLICATIONS

Patent Abstracts Of Japan, vol. 010, No. 054 (E–385), Mar. 4, 1986 & JP 60 207489 A (Matsushita Denki Sangyo KK) Oct. 19, 1985.

* cited by examiner

Primary Examiner—Robert E. Nappi
Assistant Examiner—Rita Leykin
(74) Attorney, Agent, or Firm—Friedrich Kueffner

(57) ABSTRACT

A separately excited electric machine has a rotor and a stator and a device for detecting the rotational position of the rotor relative to the stator. A position determination device is provided for determination of the rotational position by evaluation of a signal which can be tapped at the pole winding circuit and is imprinted by pole winding inductivities exhibiting rotational position dependency. The pole winding circuit has phase strands that are star-connected, and the position determination device is provided for evaluating the potential at the star point during motor operation of the machine.

16 Claims, 3 Drawing Sheets

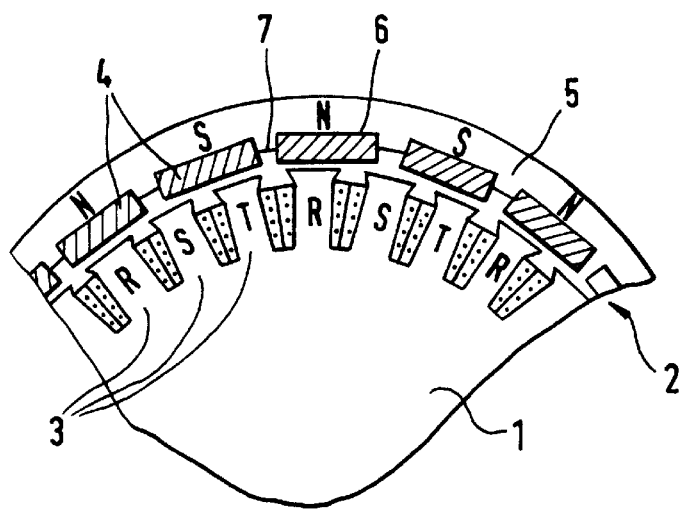
Fig.1
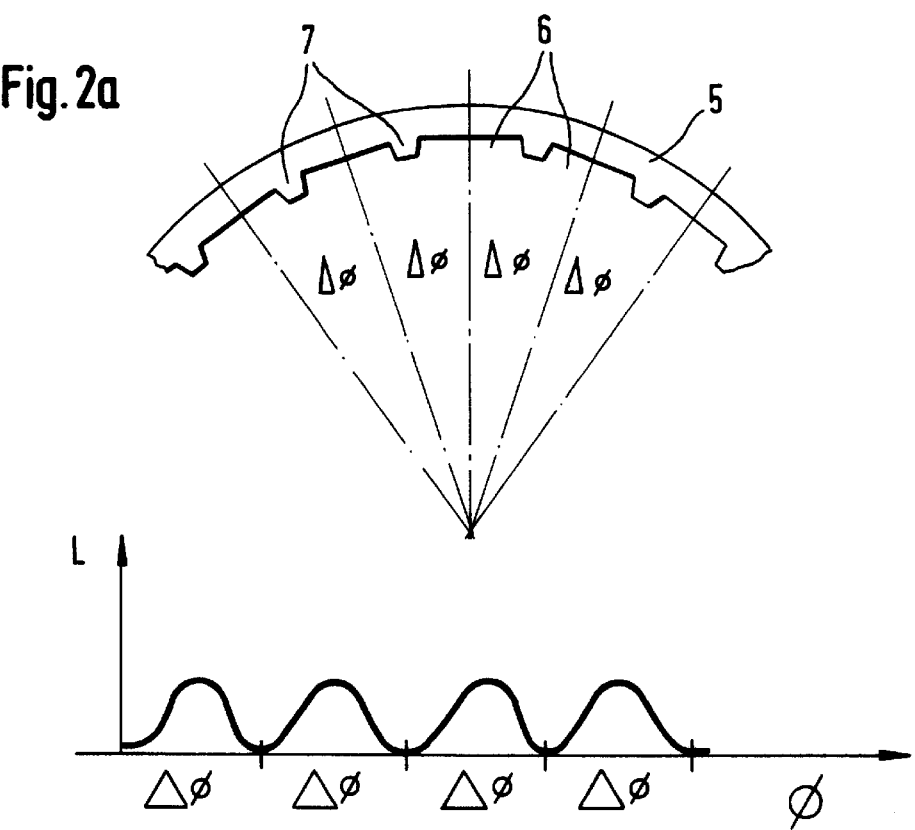
Fig.2a
Fig.2b

SEPARATELY EXCITED ELECTRIC MACHINE

BACKGROUND OF THE INVENTION

1. Field of the Invention

The invention relates to a separately excited electric machine having a rotor and a stator as well as a device for the detection of the rotational position of the rotor relative to the stator, wherein the position determination device is designed for determining the rotational position of the rotor by evaluating a signal which can be tapped at the pole winding circuit and is imprinted by pole winding inductivities having rotational position dependency.

2. Description of the Related Art

In known separately excited electric machines of this kind the device for the detection of the rotor-stator-position comprises sensors, for example, Hall generators, which detect the field orientation or/and field strength of the exciting magnetic field, wherein the rotor position relative to the stator is determined as a function of these measured values. The installation of such sensors in electric machines increases their manufacturing expenditure. Furthermore, there is often the disadvantage that a calibration of the sensors must be carried out. Finally, the arrangement of such sensors can also cause a disturbance of the field extension within the motor which can impede the proper running properties of the electric machine.

An electric machine of the aforementioned kind is known from U.S. Pat. No. 5,254,914. For determining the rotational position of the rotor while the rotor is standing still, short current pulses are sent through selected phase strands of the pole winding circuit and the subsiding inductive voltages occurring in response to the pulses are measured. The rotational position of the rotor is determined based on the basis of the sign of the difference between the subsiding time periods and the inductive voltages.

SUMMARY OF THE INVENTION

The present invention has the object to provide a novel separately excited electric machine of the aforementioned kind which allows a reliable determination of the rotational position of the rotor with a simplified circuit configuration.

The separately excited electric machine according to the invention that solves this object is characterized in that the pole winding circuit has phase strands that are star-connected and that the position determination device is designed for evaluating the potential at the star point.

Rotational position dependencies of the pole winding inductivities result at the star point, which according to the invention is the only measuring point, in potential fluctuations which are detectable measuring-technologically with minimal circuit expenditure and can be easily evaluated for determining the rotational position of the rotor with the aid of pre-stored correlating relationships between the potential and the rotational position.

The dependency of the rotational position of the pole winding inductivities can be based on the changes of the magnetization of pole winding cores caused by the excitation field. Depending on the relative arrangement of the pole winding cores and the excitation field, different magnetization of the pole winding cores may occur based on the dependency of the induction flow, that is controlling in regard to the inductivity, on the magnetic field strength of the excitation field, wherein these different magnetizations have an effect on the inductivity of the pole windings.

As an alternative, or in addition thereto, an arrangement of magnetic materials can be provided which changes the inductivity of the pole windings as a function of the rotational position. Depending on the rotational position, the respective contribution of the magnetic material arrangement in regard to the inductivity of the pole windings changes.

In one embodiment of the machine, the material arrangement is formed by a field magnet support ring that serves in particular for forming the rotor, wherein along the circumference of the field magnet support ring the material thickness or/and permeability of the ring material can change. The material thickness could, for example, change in that the field magnet support ring is circular at its inner side supporting the field magnets, while its outer side has a spirally shaped mantle with steadily increasing thickness. In this case, a univocal dependence of the pole winding inductivity from the rotational position can be achieved in the area of a complete rotation of 360°. A two-fold defined dependency about 360° could be achieved by forming the outer surface of the ring with a shape corresponding to an unsymmetric oval.

In a further embodiment of the machine, the excitation field and/or the material arrangement are designed for generating a dependency course of the pole winding inductivity from the rotational position, which returns periodically with the rotor rotation, are provided, wherein the position determination device for determining the rotary position for overlapping periods can comprise a counting device that will detect the recurrence of dependency periods beginning at a starting point. The periodically returning dependency course can result from several sequential magnetic periods that form the excitation field. On the other hand, the material thickness of the support ring could change by securing cutouts for field magnets distributed in the circumferential direction. A position determination based on the aforementioned dependency then takes place respectively within a certain rotational angle period of the rotor, while the counting device determines the respective rotational angle period of the rotor and thus the position of the rotor relative to the stator over the entire rotational angle range of 360°.

In the case of formation of a magnetic period by two field magnets positioned in a respective securing cutout, a univocal dependency would result respectively within a half magnetic period, wherein in a multi-pole machine this dependency would repeat according to the number of magnetic periods distributed over the circumference. When the securing cutouts are extended to one or more periods, univocal dependencies result respectively within the expanded angular areas.

Preferably, the position determination device is provided for producing a measuring voltage that is applied, in particular selectively via respective phase strands, to the pole windings and has a frequency that is preferably above that of the operational voltage frequency, wherein an evaluation device is provided with a filtering device for filtering a signal, representative of the momentary strand inductivities, from the star point potential.

In an especially preferred embodiment of the invention, a pulse switching is provided for the operation of the machine, especially with pulse width modulation, wherein for the purpose of signal detection the position determination device evaluates the course of the potential as a result of the voltage pulses. During pulse operation of the machine a fluctuating potential course results at the star point with increases varying according to the momentary pole winding inductivities.

BRIEF DESCRIPTION OF THE DRAWING

The invention will now be explained and described in more detail with the aid of the accompanying drawings relating to these embodiments. It is shown in:

FIG. 1 a detail of an electric machine according to the invention with a field magnet support ring having cutouts for receiving field magnets;

FIG. 2a a cutout of the support ring of the electric machine of FIG. 1;

FIG. 2b a course of inductivity of pole windings of the electric machine of FIG. 1 caused by the support ring of FIG. 2a;

DESCRIPTION OF THE PREFERRED EMBODIMENT

Figure 3:
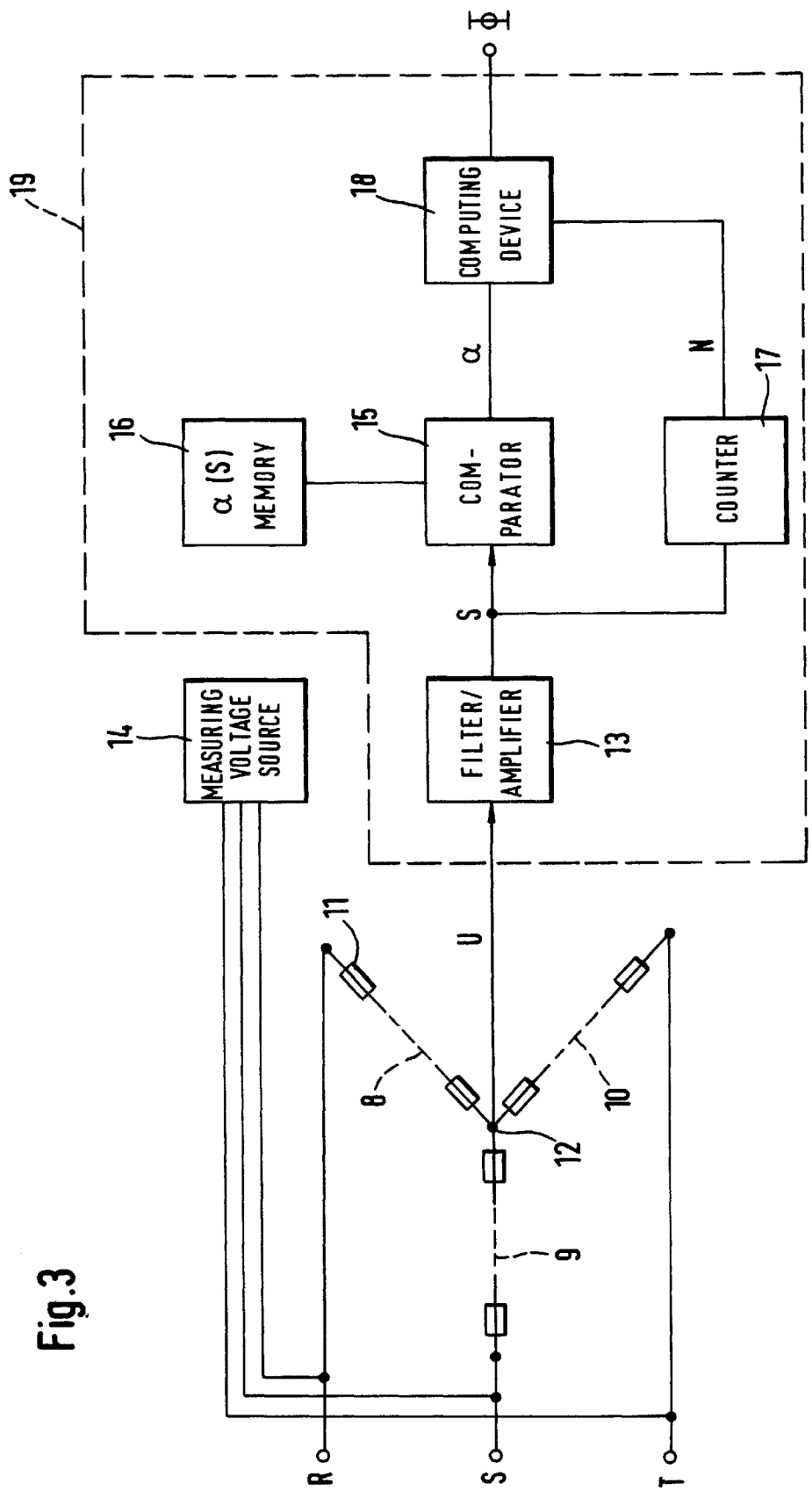
FIG. 3 a schematic representation of an embodiment according to the invention for a device for determining the respective positions of rotor and stator in the electric machine according to FIG. 1.

In FIG. 1 the reference numeral 1 refers to the stator of a multi-pole electric machine as indicated in FIG. 1 relative to which a rotor 2 is rotatable.

The stator 1 has pole heads 3 provided with windings which are positioned with their respective end faces opposite the inner side of the rotor 2. The pole windings of each third pole head are connected respectively under formation of a phase strand correspondingly to the three phases R, S, T of an operating voltage by wires that are not shown in FIG. 1.

In FIG. 1 reference numeral 4 indicates permanent magnets, wherein an alternating arrangement of a magnetic north pole and a magnetic south pole creates sequential magnetic periods in the circumferential direction of the annular rotor 2.

As can be seen especially in FIG. 2a, the magnetic support ring 5 forming the rotor 2 has cutouts 6 for mounting the permanent magnets 4, wherein the permanent magnets 4 are received in the cutouts 6 and wherein stays 7 are provided between the cutouts 6.

With the sequential arrangement of stays 7 and the cutouts 6 certain distributions of the ring material, which in the shown embodiment is iron, are formed periodically to correspond to a rotational angle $\Delta\phi$ of the rotor 2, which the inductivity of the respectively oppositely arranged pole winding approximately according to shown in FIG. 2b inductivity of the respective phase strand and, on the other hand, by the induced voltage caused by the rotation of the electric machine in the free phase strand. The signal processing unit 22 extracts from the signals U, for example, by subtraction or quotient formation, a signal S representative of the rotational position that, as already explained with respect to FIG. 3, can be used for determining the angle $\alpha$, respectively, the total rotational angle $\phi$.

With the sequential separation of the voltage supply circuit 20 the thus resulting drive interruption in the electrical machine is advantageously distributed uniformly onto all phases so that no impediment of the running of the machine results.

Figure 4:
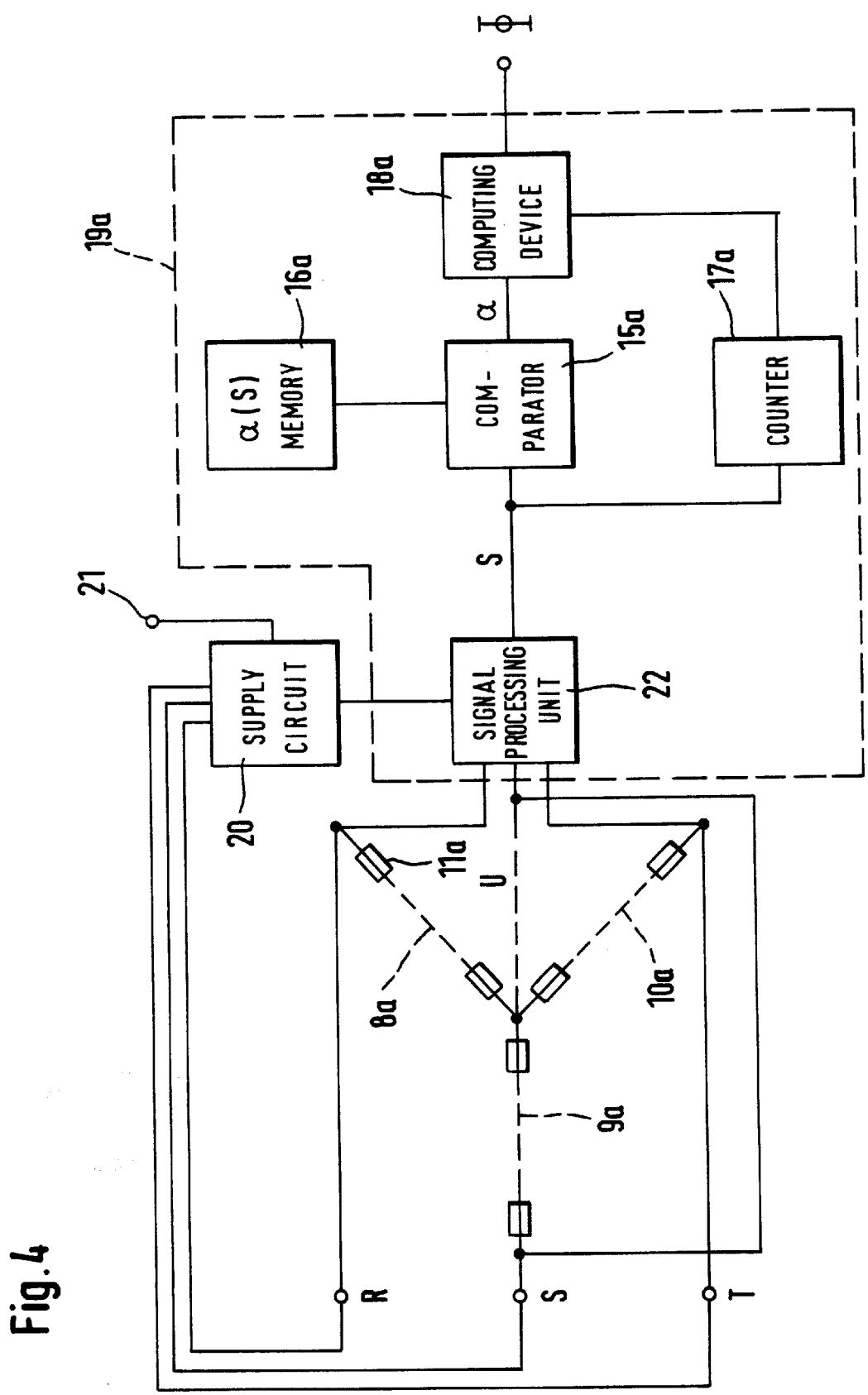
FIG. 4 a schematic representation of a further embodiment of a device for determining the rotor-stator-position in the machine according to FIG. 1.

In the circuit of FIG. 4, instead of the evaluation of the potential at the free phase ends, the star point potential could inventively be evaluated. In pulse operation a fluctuating voltage signal U results thereat from which further parameters, for example, the currents in the individual phases can be determined in addition to a signal that is representative of the rotational position.

The course of the tapped voltage signal U in the disclosed embodiment is mainly determined by the periodic changes of the pole head magnetization which results from passing through the fields of the permanent magnets 4. A further contribution to the course of the signal results from the formation of the magnet support ring 5 with periodically changing thickness of the magnetizable material that correspondingly affects the inductivity of the pole heads, as shown in FIG. 2.

When the symmetry is interrupted so that each phase does not have a repeating arrangement of the pole winding with respect to a magnetic period, a course of the voltage signal U results that is more closely approximated to a sine curve and accordingly can be more easily evaluated.

What is claimed is:

1. Separately excited electric machine with a rotor (2) and a stator (1) and a device for detecting the rotational position of the rotor relative to the stator, wherein the position determination device is provided for determination of the rotational position by evaluation of a signal which can be tapped at the pole winding circuit and is imprinted by pole winding inductivities exhibiting rotational position dependency, wherein the pole winding circuit has phase strands (8–10) that are star-connected and the position determination device is provided for evaluating the potential at the star point (12) relative to ground during motor operation of the machine, wherein the position determination device for determining the rotational position of the rotor (2) during motor operation is configured to employ rotational angle intervals ($\Delta\Phi$), in which a periodically repeated pole winding inductivity is contained as a function of the rotational angle of the rotor, wherein the position determination device is configured to extract from the potential at the star point a signal (S) representative of the rotational position of the rotor within the rotational angle interval ($\Delta\Phi$), which signal (S) is based on a measuring voltage, overlaid onto an operational voltage and changed according to the respective pole winding intensity, or a voltage value, occurring in response to switching of operational voltage pulses and imprinted by the respective pole winding inductivity.

2. Electric machine according to claim 1, wherein
   the rotational position dependency of the pole winding inductivities is based on changes of the magnetization of pole winding cores by the excitation field.

3. Electric machine according to claim 1, wherein
   an arrangement of magnetic materials is provided that changes the inductivity of the pole windings as a function of the rotational position.

4. Electric machine according to claim 3, wherein the material arrangement is formed by a field magnet support ring (5) that is provided for forming the rotor (2).

5. Electric machine according to claim 4, wherein
   the material thickness or/and permeability of the ring material changes along the circumference of the field magnet support ring (5).

6. Electric machine according to claim 1, wherein the excitation field and/or the material arrangement are designed for generating a dependency course of the periodically repeated pole winding inductivity from the rotational position of the rotor.

7. Electric machine according to claim 6, wherein
the position determination device for determining the rotational position of the rotor for overlapping periods comprises a counting device (17) detecting the return of the dependency periods.

8. Electric machine according to claim 4, wherein
the material thickness of the support ring (5) changes according to securing cutouts (6) for field magnets (4) distributed over its circumference.

9. Electric machine according to claim 4, wherein the position determination device is provided for generating the measuring voltage.

10. Electric machine according to claim 1, wherein the position determination device has a filter device (13) for filtering the signal (S).

11. Electric machine according to claim 9, wherein a pulse switching device is provided for generating operational voltage pulses.

12. Electric machine according to claim 9, wherein the measuring voltage is selectively supplied via the respective phase strands to the pole windings.

13. Electric machine according to claim 9, wherein the measuring voltage has a frequency above the operational voltage frequency.

14. Electric machine according to claim 11, wherein the pulse switching device has pulse width modulation.

15. Electric machine according to claim 11, wherein the position determination device evaluates continuously the voltage values.

16. Electric machine according to claim 11, wherein the position determination device evaluates continuously the voltage values with additional evaluation of the phase strand currents.

* * * * *